US006370440B2

United States Patent

Nakagawa et al.

(10) Patent No.: US 6,370,440 B2

(45) Date of Patent: *Apr. 9, 2002

(54) DEVICE AND METHOD FOR SUPPORTING SYSTEM DEVELOPMENT AND COMPUTER-READABLE MEDIUM

(75) Inventors: Sachiko Nakagawa; Toshiyuki Araki; Hiroaki Maezawa; Yoshihiro Giga; Mimiko Hayashi; Satoshi Kono; Masayuki Murata; Fumie Izumikawa; Kouya Takeshita; Syutaro Katsuki, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/141,014

(22) Filed: Aug. 27, 1998

(30) Foreign Application Priority Data

Dec. 19, 1997 (JP) .............................................. 9-351673

(51) Int. Cl.[7] ................................................ G06F 19/00

(52) U.S. Cl. ........................................... 700/97; 700/96

(58) Field of Search ........................... 700/96, 97, 105, 700/121; 705/7

(56) References Cited

U.S. PATENT DOCUMENTS

| | | | | | |
|---|---|---|---|---|---|
| 5,357,440 | A | * | 10/1994 | Talbott et al. | 700/97 |
| 5,402,349 | A | * | 3/1995 | Fujita et al. | 700/97 |
| 5,638,539 | A | * | 6/1997 | Goti | 707/1 |
| 5,671,415 | A | * | 9/1997 | Hossain | 717/1 |
| 5,812,394 | A | * | 9/1998 | Lewis et al. | 700/17 |
| 5,877,966 | A | * | 3/1999 | Morris et al. | 716/4 |
| 6,185,469 | B1 | * | 2/2001 | Lewis et al. | 700/99 |

* cited by examiner

*Primary Examiner*—William Grant
*Assistant Examiner*—Paul Rodriguez
(74) *Attorney, Agent, or Firm*—Armstrong, Westerman, & Hattori, LLP

(57) ABSTRACT

A device for supporting development of a system, the device including a first device for registering standard operations of the system into a first library by classifying the standard operations from control and work points of view. The device also includes a second device for registering programs corresponding to a plurality of predetermined system executable functions into a second library by referring to the standard operations registered in the first library.

12 Claims, 26 Drawing Sheets

FIG. 3

| ITEM | SUB-ITEM 1 | SUB-ITEM 2 |
| --- | --- | --- |
| CONTROL | WAFER CONTROL | 1. BASIC ITEMS — ATTRIBUTE, ID, CONFIGURATION<br>2. SPECIFICATIONS<br>3. UNDERSTANDING OF CURRENT CONDITION — LOCATION, STATE, QUANTITY<br>4. HISTORY |
| | LOT CONTROL | DITTO |
| | CONTROL OF CONTAINERS | DITTO |
| | CONTROL OF RETICLES | DITTO |
| | CONTROL OF EQUIPMENT | DITTO |
| | | |
| WORK | WORK ELEMENT | WAFER, LOT<br>CONTAINER<br>EQUIPMENT<br>RETICLE<br>INDIRECT MATERIALS<br>SYSTEM TERMINAL |
| | WORK FLOW | PRODUCT PROCESSING OPERATION<br>PROCESS SUPPORT ACTIVITIES<br>ABNORMALITY HANDLING WORK |

3. LIBRARY FOR CONTROL OF RETICLES
3. 1. BASIC ITEMS
3. 1. 1. ATTRIBUTES
(A00000) MAINTAIN FOLLOWING INFORMATION AS ATTRIBUTES.
NAME OF SERIES
NAME OF LAYER
SUFFIX
(A0000l) SCALING FACTOR
(A00002) SIZE
(A00003) EXISTENCE OF PELLICLE
(A00004) TYPE OF PELLICLE
(A00005) EXISTENCE OF PHASE SHIFT
(A00006) TYPE OF PHASE SHIFT
(A00007) LOCATION OF PRODUCTION
(A00008) DATE OF PRODUCTION
(A00009) TYPE OF STEPPER
(A000010) ACCUMULATED NUMBER OF USAGE
(A000011) MAXIMUM NUMBER OF USAGE ALLOWED 3. 1. 2. ID
(I00000) RETICLE ID IS EQUIVALENT TO RETICLE PRODUCTION NUMBER.
[HOW TO INDICATE (MEDIUM)]
(I01000) INDICATE ID AS A BAR-CODE AND STICK ONTO RETICLE CASE.

3. 1. 3. CONFIGURATION
(C00000) TREAT RETICLE CASE , RETICLE BODY AND PELLICLE AS AN INTEGRATED BODY .

3. 2. SPECIFICATIONS
(M00000) SPECIFICATIONS OF RETICLE CONFORM TO PREDETERMINED STANDARDS .
[ QUALITY]
(M01000) IMPLEMENT REGULAR PARTICLE INSPECTION USING INSPECTION EQUIPMENT .
(M01001) IMPLEMENT PARTICLE INSPECTION AT FUNCTIONS IN STEPPER EQUIPMENT FOR INDIVIDUAL RETICLE SET .

3. 3. UNDERSTANDING OF CURRENT CONDITION 3. 3. 1. LOCATION (P00000) LOCATION OF RETICLE IS KNOWN TO THE FOLLOWING LEVEL.

STORAGE LOCATION OF RETICLE.

MACHINE ID NUMBER OF STEPPER EQUIPMENT.

(P00001) SLOT POSITION AND LOAD POSITION WITHIN STEPPER.

[STORAGE LOCATION]

(P01001) USE RETICLE STOCKER AS RETICLE STORAGE LOCATION.

(P01002) USE STORAGE SHELF AS RETICLE STORAGE LOCATION.

(P01003) USE RETICLE CHANGER IN STEPPER AS RETICLE STORAGE LOCATION.

3. 3. 2. STATE (S00001) IDENTIFY WHICH STATE OF THE FOLLOWING STATE TRANSISION DIAGRAM THE RETICLE IS IN.

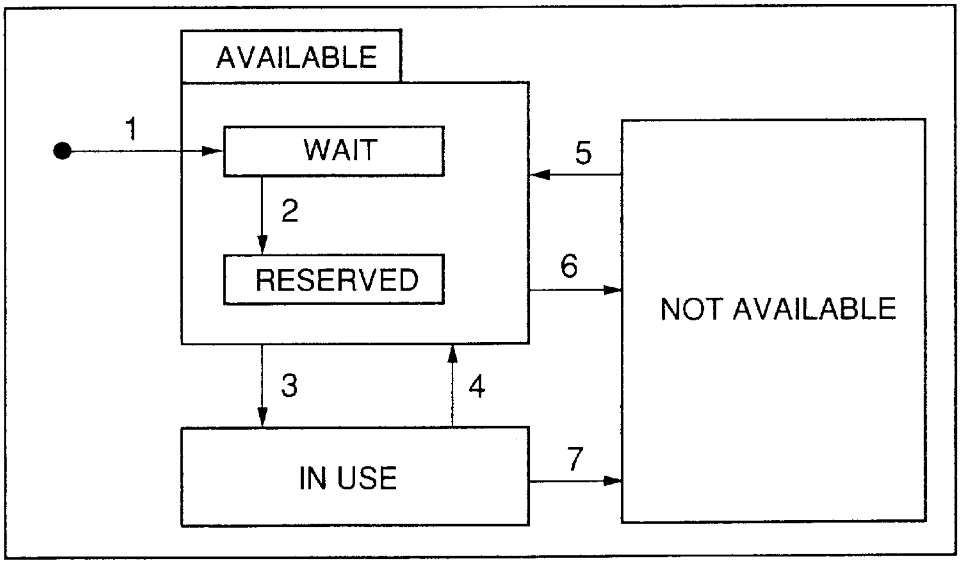

STATE TRANSITION DIAGRAM OF RETICLES (#1)

STATE OF RETICLE (#1)

| STATE | DESCRIPTION OF STATE |
|---|---|
| WAIT | RETICLE IS STORED IN CONTROL AREA. INCLUDES CASE WHERE RETICLE IS STORED IN STEPPER EQUIPMENT. |
| RESERVED | RETICLE IS RESERVED FOR LATER USE. |
| IN USE | RETICLE IS LOADED AND IS PERFORMING WAFER PROCESS. |
| AVAILABLE | RETICLE IS AVAILABLE. |
| NOT AVAILABLE | RETICLE IS NOT AVAILABLE. INCLUDES CLEANING AND REGULAR CHECK OF RETICLE. |

STATE TRANSITION TABLE OF RETICLE (#1)

| # | CURRENT STATE | TRIGGER | NEW STATE | COMMENT |
|---|---|---|---|---|
| 1 | | SUPPLIED TO FABRICATION FACILITY. | WAIT | |
| 2 | WAIT | INSTRUCTION FOR RESERVATION. | RESERVED | |
| 3 | AVAILABLE | LOAD RETICLE. | IN USE | |
| 4 | IN USE | SET IN RETICLE CHANGER. | AVAILABLE | |
| 5 | NOT AVAILABLE | COMPLETION OF CLEANING, COMPLETION OF REPAIRING. | AVAILABLE | |
| 6 | AVAILABLE | NG IN CONTAMITATION. INSPECTION INSTRUCTION FOR CLEANING OR REGULAR CHECK. | NOT AVAILABLE | |
| 7 | IN USE | BREAKAGE OF RETICLE. | NOT AVAILABLE | |

(S00002) IDENTIFY WHICH STATE OF THE FOLLOWING STATE TRANSITION DIAGRAM THE RETICLE IS IN.

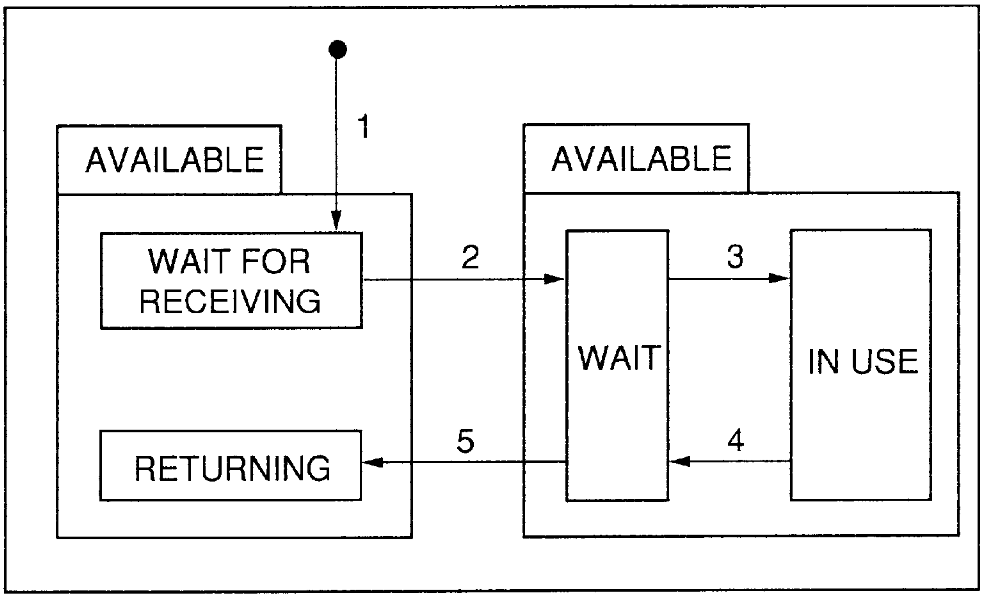

STATE TRANSITION DIAGRAM OF RETICLE (#2)

DESCRIPTION OF STATE OF RETICLE (#2)

| STATE | DESCRIPTION OF STATE |
|---|---|
| WAIT FOR RECEIVING | RETICLE IS WAITING TO BE SUPPLIED TO THE FABRICATION FACILITY. |
| WAIT | RETICLE IS STORED IN CONTROL AREA. INCLUDES A CASE WHERE RETICLE IS STORED IN STEPPER EQUIPMENT. |
| IN USE | RETICLE IS LOADED AND IS PERFORMING WAFER PROCESS. |
| SENT OUT | SENT OUT OF FABRICATION FACILITY, FOR EXAMPLE, TO AN OFFICE. |
| AVAILABLE | RETICLE IS AVAILABLE. |
| NOT AVAILABLE | RETICLE IS NOT AVAILABLE. INCLUDES CLEANING AND REGULAR CHECK OF RETICLE. |

STATE TRANSITION TABLE OF RETICLE (#2)

| # | CURRENT STATE | TRIGGER | NEW STATE | COMMENT |
|---|---|---|---|---|
| 1 | | INFORMATION ABOUT RETICLE TO BE SUPPLIED IS ANNOUNCED. | WAIT FOR RECEIVING | |
| 2 | WAIT FOR RECEIVING | RECEIVING PROCESS TO THE CONTROL AREA IS PERFORMED. | WAIT | |
| 3 | WAIT | TRACK- IN A LOT TO BE PROCESSED. | IN USE | |
| 4 | IN USE | TRACK- OUT A LOT TO BE PROCESSED. | WAIT | |
| 5 | WAIT | SENT OUT FROM CONTROL AREA . | SENT OUT | |

(S00003) IDENTIFY WHICH STATE OF THE FOLLOWING STATE TRANSITION DIAGRAM THE RETICLE IS IN .

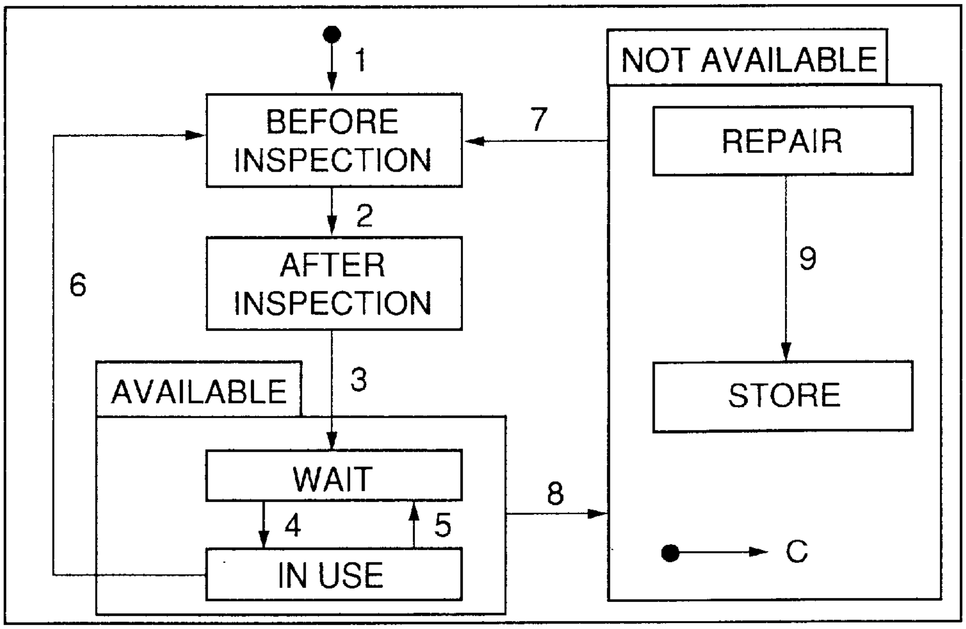

STATE TRANSITION DIAGRAM OF RETICLE (#3)

DESCRIPTION OF STATE OF RETICLE (#3)

| STATE | DESCRIPTION OF STATE |
|---|---|
| BEFORE INSPECTION | INSPECTION NOT COMPLETED. |
| AFTER INSPECTION | INSPECTION COMPLETED NORMLLY. |
| WAIT | ALLOWED FOR USE. |
| IN USE | IN USE AT THE FABRICATION FACILITY. |
| STORED | STORED. |
| REPAIRING | NOT AVAILABLE BECAUSE OF REPAIRS. |
| AVAILABLE | IT IS POSSIBLE TO USE THE RETICLE. |
| NOT AVAILABLE | IT IS NOT POSSIBLE TO USE THE RETICLE. |

STATE TRANSITION TABLE OF RETICLE (#3)

| # | CURRENT STATE | TRIGGER | NEW STATE | COMMENT |
|---|---|---|---|---|
| 1 | | RECEIPT OF THE RETICLE . | BEFORE INSPECTION | |
| 2 | BEFORE INSPECTION | COMPLETION OF INSPECTION . | AFTER INSPECTION | |
| 3 | AFTER INSPECTION | | WAIT | |
| 4 | WAIT | | IN USE | |
| 5 | IN USE | | WAIT | |
| 6 | IN USE | REGULAR INSPECTION CYCLE. | BEFORE INSPECTION | |
| 7 | NOT AVAILABLE | REUSE. | BEFORE INSPECTION | |
| 8 | AVAILABLE | BREAKAGE OR LIFE OF RETICLE. | NOT AVAILABLE | |
| 9 | REPAIR | COMPLETION OF REPAIRS. | STORE | |

(S00004) STATE OF RETICLE IS NOT CONTROLLED.

3. 3. 3. QUANTITY
QUANTITY OF RETICLE WILL BE UNDERSTOOD FROM THE FOLLOWING ITEMS.
(N00000) NAME OF SERIES, NAME OF LAYER AND SUFFIX.

3. 4. HISTORY
(H00000) HISTORY IS CONTROLLED FOR THE FOLLOWING ITEMS. USED EQUIPMENT ID, USED DATE AND NUMBER OF PROCESSED RETICLES.
(H00001) RESULT OF INSPECTION OF RETICLE, DATE OF INSPECTION.
(H00002) DATE OF CHANGE OF STATE OF RETICLE, NEW STATE AND NAME OF OPERATOR WHO HAS CHANGED THE STATE.

1. OUTLINE OF EQUIPMENT

| | | |
|---|---|---|
| NAME | | THIN FILM DEPOSITION EQUIPMENT |
| MODEL | | THIN FILM DEPOSITION EQUIPMENT XXXX |
| VENDOR | | XXXX Co.<br>XXXX LIMITED |
| COMMUNICATION SPECIFICATIONS | JAPANESE EDITION | XXXX HOST COMMUNICATION I/F SPECIFICATIONS DOC. 1.0 REV 1.0 |
| | ENGLISH EDITION | XXXX HOST COMMUNICATION I/F SPECIFICATIONS DOC. 1.0 REV 1.0 |
| ADDITIONAL FUNCTION AND MECHANISM | | FUNCTION TO COUNT THE NUMBER OF WAFERS AT THE START OF PROCESSING |

2. PREMISES OF OPERATION (1) ABOUT BATCH SIZE
THE BATCH SIZE OF THIS EQUIPMENT IS AS FOLLOWS.

| TYPE | PROCESS NAME | BATCH SIZE (WAFER) |
|---|---|---|
| CVD | AAA | 150 |
| | BBB | 100 |
| | CCC | 50 |
| DIFF. (DIFFUSION) | DDD | 100 |
| | EEE | 150 |
| | FFF | 150 |

(2) ABOUT STOCKER OPERATION OF CARRIER STAGE BY PRODUCT CASETTE.

THIS EQUIPMENT HAS A CARRIER STAGE INSIDE THE EQUIPMENT ( INTERIOR CASSETTE BUFFER ). IT IS POSSIBLE TO STORE A PRODUCT CASSETTE FOR THE NEXT PROCESS AT THE CARRIER STAGE (STOCKER OPERATION).

1. OPERATION PROCEDURE
(1) OPERATION FOR STARTING PROCESSING

| ON - LINE | OFF - LINE |
|---|---|
| 1. CASSETTE LOADING<br>* LOAD A PAIR OF CASSETTES FOR EACH TYPE. ( LAST CASSETTE OF THE SAME TYPE MAY BE INSERTED AS A SINGLE CASSETTE.)<br>* WHEN INSERTING A SINGLE CASSETTE . INSERT IN "PORT 1".<br>* PRESS XXX SWITCH OF THE EQUIPMENT AFTER EACH TIME INSERTING CASSETTE (S).<br>* CASSETTES ARE LOADED IN THE FOLLOWING ORDER .<br>① CASSETTES FOR AAA<br>② CASSETTES FOR BBB | 1. RECIPE SETTING<br>* RECIPE SHOULD BE PRE-SET SINCE THERE IS A CONSTRAINT OF THE CONTROLLER. |
| 2. RECIPE SETTING | 2. CASSETTE LOADING<br>* PERFORMED IN THE SAME MANNER AS SHOWN FOR ON-LINE STATE. |
| 3. INSTRUCTION FOR STARTING PROCESSING | 3. INSTRUCTION FOR STARTING PROCESSING |

4. DATA SPECIFICATIONS (1) RECIPE

RUN-TIME PARAMETER

| DATA ITEMS | OUTLINE |
|---|---|
| AAA | VALUE OF AAA AT XXX |
| BBB | VALUE OF BBB AT XXX |

(2) DISCRETE DATA COLLECTIONS

| DATA ITEMS | COLLECTION TIMINGS | OUTLINE |
|---|---|---|
| AAA (MAX) | XXX | VALUE OF AAA AT XXX |
| AAA (MIN) | YYY | VALUE OF BBB AT XXX |
| AAA (AVE) | ZZZ | VALUE OF CCC AT XXX |

(3) TRACE DATA COLLECTIONS

| DATA ITEMS | TIMINGS | | | OUTLINE |
|---|---|---|---|---|
| | START TO TRACE | SAMPLING INTERVAL | TOTAL SAMPLES | |
| AAA | START PROCESSING | X sec | XXX | VALUE OF AAA AT XXX |
| BBB | START PROCESSING | X sec | XXX | VALUE OF BBB AT XXX |

(4) ALARM COLLECTIONS

| DATA ITEMS | ALARM LEVEL | | |
|---|---|---|---|
| | LEVEL 1 | LEVEL 2 | LEVEL 3 |
| XXX TYPE ALARM | ○ | | |
| XXX TYPE ALARM | | ○ | |
| XXX TYPE ALARM | | | ○ |

CONTROL DATA

1. SPC CONTROL

| | | KEY | TYPE | EXAMPLE |
|---|---|---|---|---|
| 1 | NAME OF PROCESS STEP | * | CHAR | AA ETCHING |
| 2 | STANDARD VALUE | | CHAR | 0.56 μ |
| 3 | CONTROL VALUE | | CHAR | ±0.005 μ |
| | | | | |

( etc . )

n. PROCESS HISTORY CONTROL

| | | KEY | TYPE | EXAMPLE |
|---|---|---|---|---|
| 1 | LOT ID | * | CHAR | FED00005678 |
| 2 | NAME OF PROCESS STEP | | CHAR | AA ETCHING |
| 3 | RESULT OF MEASUREMENT | | CHAR | 0.561 μ |
| | | | | |

( etc . )

MESSAGE INTERFACE

X. DISPLAY OF RESULTS OF MEASUREMENT (1) INPUT INFORMATION
LOT ID, etc.

(2) OUTPUT INFORMATION
NAME OF PROCESS STEP, RESULTS OF MEASUREMENT, etc.

(3) ACTION
SEARCH RESULT OF MEASUREMENT OF THE DESIGNATED LOT ID (4) APPLICATIONS
(DESCRIBE CORRESPONDING WORK ELEMENT)

( etc . )

4. 4. CONTROL OF RETICLES
4. 4. 1. BASIC ITEMS
4. 4. 1. 1. ATTRIBUTES
(A00000) MAINTAIN FOLLOWING INFORMATION AS ATTRIBUTES.
NAME OF SERIES
NAME OF LAYER
SUFFIX
(A00001) SCALING FACTOR
(A00002) SIZE
(A00007) LOCATION OF PRODUCTION
(A00008) DATE OF PRODUCTION
(A000010) ACCUMULATED NUMBER OF USAGE
(A000011) MAXIMUM NUMBER OF USAGE ALLOWED 4. 4. 1. 2. ID
(I00000) RETICLE ID IS EQUIVALENT TO RETICLE PRODUCTION NUMBER.
[HOW TO INDICATE (MEDIUM) ]
(I01000) INDICATE ID AS A BARCODE AND STICK ONTO RETICLE CASE .

4. 4. 1. 3. CONFIGURATION
(C00000) TREAT RETICLE CASE, RETICLE BODY AND PELLICLE AS AN INTEGRATED BODY .

4. 4. 2. SPECIFICATIONS
(M00000) SPECIFICATIONS OF RETICLE CONFORMS TO PREDETERMINED STANDARDS.
[ QUALITY ]
(M01000) IMPLEMENT REGULAR PARTICLE INSPECTION USING INSPECTION EQUIPMENT.
(M01001) IMPLEMENT PARTICLE INSPECTION AT FUNCTIONS IN STEPPER EQUIPMENT FOR INDIVIDUAL RETICLE SET .

4. 4. 3. UNDERSTANDING OF CURRENT CONDITION 4. 4. 3. 1. LOCATION (P00000) LOCATION OF RETICLE IS KNOWN TO THE FOLLOWING LEVEL .
STORAGE LOCATION OF RETICLE
MACHINE ID NUMBER OF STEPPER EQUIPMENT (P00001) SLOT POSITION AND LOAD POSITION WITHIN STEPPER

[STORAGE LOCATION]

(P01001) USE RETICLE STOCKER AS RETICLE STORAGE LOCATION.

(P01002) USE STORAGE SHELF AS RETICLE STORAGE LOCATION.

(P01003) USE RETICLE CHANGER IN STEPPER AS RETICLE STORAGE LOCATION .

4. 4. 3. 2. STATE (S00002) IDENTIFY WHICH STATE OF THE FOLLOWING STATE TRANSITION DIAGRAM THE RETICLE IS IN.

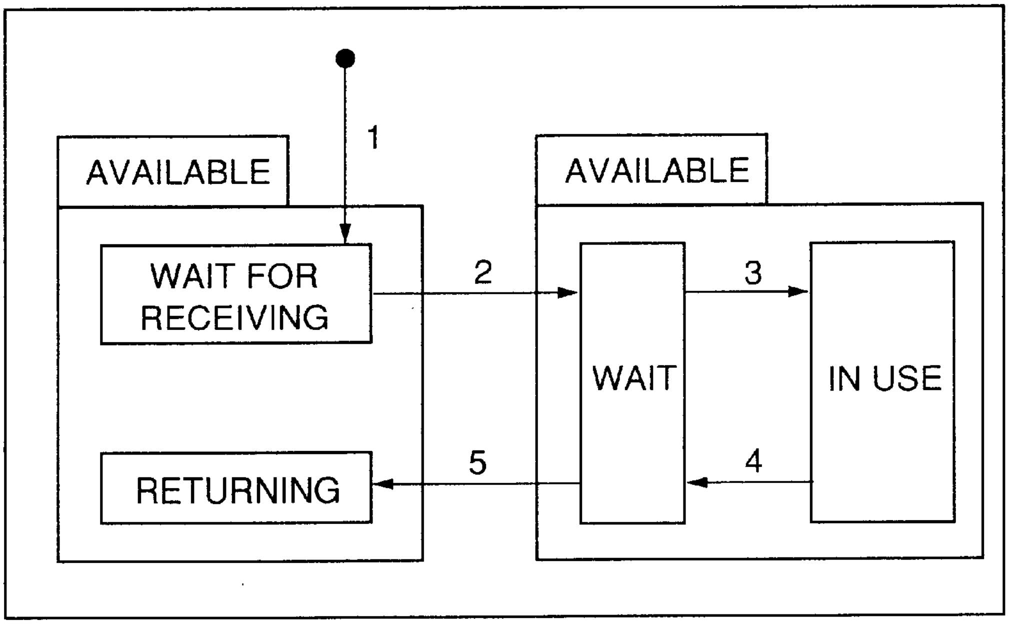

STATE TRANSITION DIAGRAM OF RETICLES (#2)

STATE OF RETICLE (#2)

| STATE | DESCRIPTION OF STATE |
|---|---|
| WAIT FOR RECEIVING | RETICLE IS WAITING TO BE SUPPLIED TO THE FABRICATION FACILITY. |
| WAIT | RETICLE IS STORED IN CONTROL AREA . INCLUDES A CASE WHERE RETICLE IS STORED IN STEPPER EQUIPMENT. |
| IN USE | RETICLE IS LOADED AND IS PERFORMING WAFER PROCESS. |
| SENT OUT | SENT OUT OF FABRICATION FACILITY, FOR EXAMPLE, TO AN OFFICE. |
| AVAILABLE | RETICLE IS AVAILABLE. |
| NOT AVAILABLE | RETICLE IS NOT AVAILABLE. INCLUDES CLEANING AND REGULAR CHECK OF RETICLE. |

STATE TRANSITION TABLE OF RETICLE (#2)

| # | CURRENT STATE | TRIGGER | NEW STATE | COMMENT |
|---|---|---|---|---|
| 1 | | INFORMATION ABOUT RETICLE TO BE SUPPLIED IS ANNOUNCED. | WAIT | |
| 2 | WAIT FOR RECEIVING | RECEIVING PROCESS TO THE CONTROL AREA IS PERFORMED. | WAIT | |
| 3 | WAIT | TRACK-IN A LOT TO BE PROCESSED. | IN USE | |
| 4 | IN USE | TRACK-OUT A LOT TO BE PROCESSED. | WAIT | |
| 5 | WAIT | SENT OUT FROM CONTROL AREA. | SENT OUT | |

4. 4. 3. 3 QUANTITY

QUANTITY OF THE RETICLES WILL BE UNDERTSTOOD FROM THE FOLLOWING ITEMS.

(N00000) NAME OF SERIES, NAME OF LAYER AND SUFFIX

4. 4. 4. HISTORY (H00000) HISTORY IS CONTROLLED FOR THE FOLLOWING ITEMS. USED EQUIPNENT ID, USED DATE AND NUMBER OF PROCESSED RETICLES.

(H00001) RESULT OF INSPECTION OF RETICLE, DATE OF INSPECTION.

(H00002) DATE OF CHANGE OF STATE OF RETICLE, NEW STATE AND NAME OF OPERATOR WHO HAS CHANGED THE STATE.

DEVICE AND METHOD FOR SUPPORTING SYSTEM DEVELOPMENT AND COMPUTER-READABLE MEDIUM

CROSS REFERENCE TO RELATED APPLICATION

The present application is based on Japanese priority application No. 9-351673 filed on Dec. 19, 1997 in which the entire contents are hereby incorporated by reference.

BACKGROUND OF THE INVENTION

1. Field of the Invention

The present invention generally relates to a method and a system for newly building or modifying a system constructed by a plurality of equipment, for example, a semiconductor device fabrication facility, and particularly relates to a system development supporting device for implementing design, development, modification and maintenance of the system with improved efficiency.

For example, in a wafer process of a semiconductor device fabrication facility, a circuit pattern is formed on a silicon wafer under predetermined conditions using such equipment as oxidization equipment, etching equipment and thin film deposition equipment. Each equipment is controlled by a computer and complicated wafer processes are controlled by a program including a few hundred to a few thousand program steps. In a semiconductor industry, there is a need for multitype low quantity production. Also, the latest technology is frequently introduced into the semiconductor industry. Therefore, in the semiconductor industry, various equipment and/or programs (corresponding to manufacturing conditions) are frequently modified.

2. Description of the Related Art

From the above-described reasons, in the related art, each semiconductor device fabrication facility is individually designed and operated. For example, when building a new fabrication facility, various equipment are introduced which are considered to be appropriate with regard to types and quantities of semiconductor devices to be produced at that fabrication facility. Then, programs for controlling such equipment are customized. As a result, programs, manufacturing conditions, and operations will be different for each fabrication facility.

SUMMARY OF THE INVENTION

As described above, various operations will be carried out at each fabrication facility depending on a type of the semiconductor device, a process and a degree of completion of the semiconductor device. Also, a composition of the type of semiconductor device manufactured is different for each fabrication facility, thus processes and manufacturing conditions at each fabrication facility are also different. In other words, an operation of individual equipment is different for each fabrication facility, and, thus, there is no compatibility between each fabrication facility. Therefore, a new design is necessary when newly building a fabrication facility, and, also, modification and maintenance of operations are required for each fabrication facility. Accordingly, the above-described operation of each fabrication facility will be inefficient when regarded as a whole system.

Therefore, it is an object of the present invention to solve problems related to the above-described prior art.

It is another and more specific object of the present invention to provide a system development supporting device which can, efficiently and easily, support construction of a new fabrication facility, modification of operations and maintenance.

In order to achieve the above objects according to the present invention, a device for supporting development of a system includes first means for registering standard operations of the system into a first library by classifying the standard operations from control and work points of view and second means for registering programs corresponding to a plurality of predetermined system executable functions into a second library by referring to the standard operations registered in the first library. Also, a method to be implemented by such a device, a computer readable medium storing program code for such a method and an article of manufacture including such a computer usable medium are provided.

In the device, method, computer readable medium and article of manufacture, the operations of the fabrication facility are not described by each process step in terms of equipment used or conditions, but are described in terms of control and work so as to concern work to be carried out at each process step and associated items to be controlled. Therefore, it is easy to register common operations into libraries and to customize the system based on the libraries. Also, by having programs for realizing functions required at fabrication facility registered in libraries in advance, it is possible to select and use only necessary functions and to easily provide required functions. As a result, operations for each fabrication facility may be standardized or may be common, and equipment and functions used at each fabrication facility may also be common. Thus, the maintenance is also facilitated.

It is still another object of the present invention to provide a device and a method which facilitate the registering of operations into libraries and can easily describe operations required at each fabrication facility.

In order to achieve the above object, the first means registers the standard operations of the system using operation units which are basic units of control and work.

It is yet another object of the present invention to provide a device and a method which can easily and efficiently obtain fabrication facility operation specifications specifying a system within a certain fabrication facility.

In order to achieve the above object, the system development supporting device further includes third means for creating fabrication facility operation specifications specifying operations of the system by selecting information related to operations of the system from the information registered in the first library and by customizing the selected information. A method to be implemented by such a device is also provided.

It is yet another object of the present invention to easily and efficiently obtain functions necessary for the system.

In order to achieve the above object, the system development supporting further includes fourth means for obtaining functions necessary for the system by selecting functions required for the system from the plurality of functions registered in the second library and by customizing the selected functions. A method to be implemented by such a device is also provided.

It is yet another object of the present invention to easily and efficiently construct a new fabrication facility based on the operations of an existing fabrication facility or modify the operations of an existing fabrication facility.

In order to achieve the above object, the system development supporting device further includes fifth means for determining whether information related to the operations of the system exists in the information registered in the first library, and sixth means for adding operations of the system in to the first library if the fifth means determines that the information related to the operations of the system exists in the information registered in the first library. A method to be implemented by such a device is also provided. Further, in order to achieve the above object, the first library and the fabrication facility operation specifications are of a common format. Also, a method using the second library and the fabrication facility operation specifications of a common format is provided.

Other objects and further features of the present invention will be apparent from the following detailed description when read in conjunction with the accompanying drawings.

BRIEF DESCRIPTION OF THE DRAWINGS

FIG. 3 is a diagram showing a fabrication facility operation library and a format of fabrication facility operation specifications.

FIGS. 4 to 10 are diagrams showing one example of a fabrication facility operation library.

FIGS. 11 to 13 are diagrams showing one example of operation specifications for each equipment.

FIG. 14 is a diagram showing one example of function specifications.

FIGS. 15 to 18 are diagrams showing one example of fabrication facility operation specifications.

DETAILED DESCRIPTION OF THE PREFERRED EMBODIMENTS

In the following, a principle and an embodiment of the present invention will be described with reference to the accompanying drawings.

Figure 1:
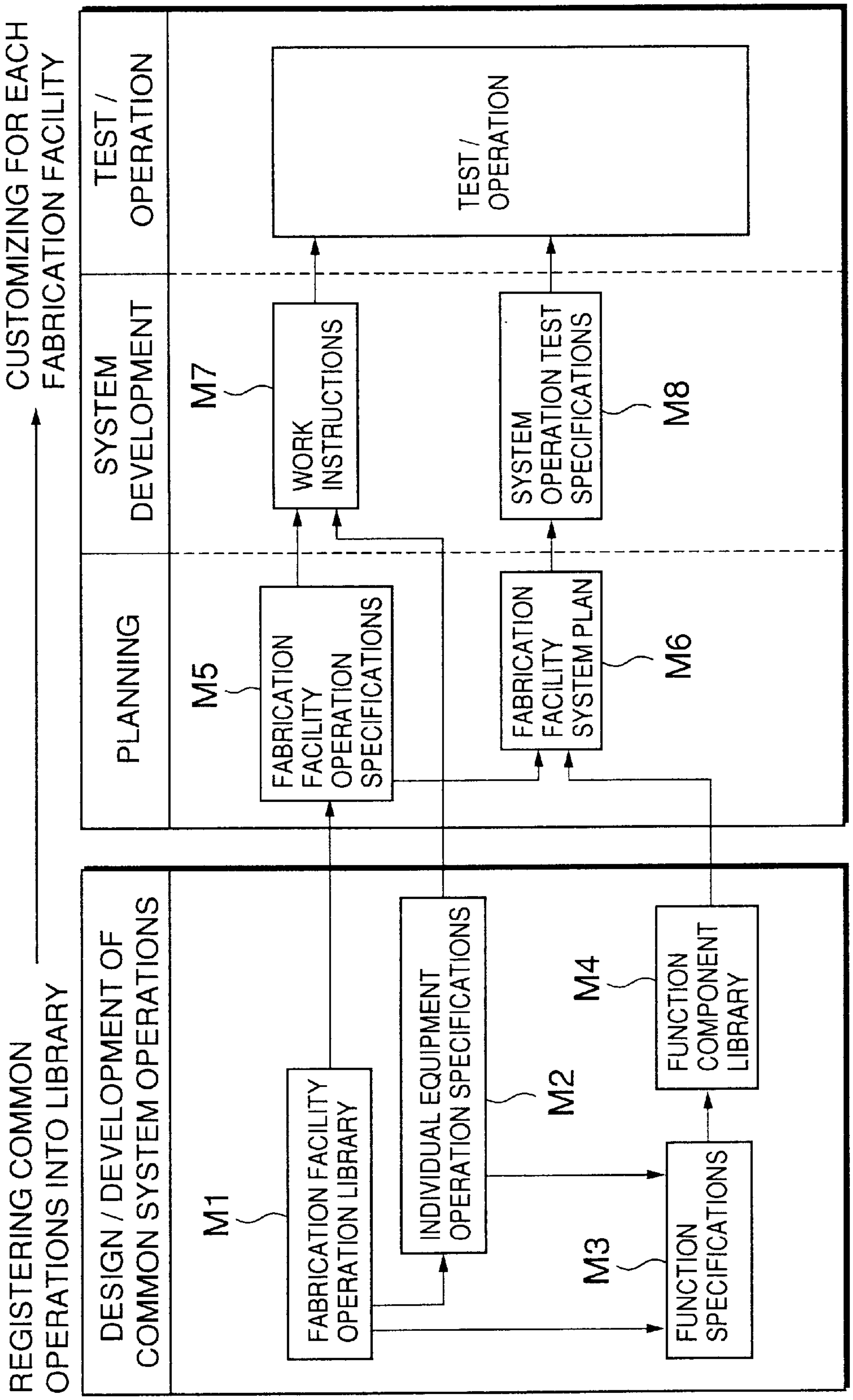
FIG. 1 is a schematic diagram showing a basic conception of the present invention.

First of all, a basic concept of the present invention will be described. As shown in FIG. 1, operations common to all fabrication facilities are registered into libraries. Then, customizing for each fabrication facility is implemented by using these libraries.

In order to register common operations into libraries, first, operations common to a plurality of fabrication facilities are described in a predetermined format from control and work points of view. Then, such common operations are stored in a database. This is referred to as a fabrication facility operation library M1. Secondly, individual equipment operation specifications M2 are created in which operations for individual equipment are described. Necessary operations in the individual equipment operation specifications M2 are stored in the database. Thirdly, using the fabrication facility operation library M1 and the individual equipment operation specifications M2 and based on common operations defined in the fabrication facility operation library M1, function specifications M3 are created in which a specification for an individual function is specified. The function specifications M3 are stored in the database. The specification for an individual function describes a function for controlling a fabrication facility operation, such as progress control and yield control. Also, programs (function components) for implementing functions described in the function specifications M3 are created in advance and are registered in a library which may be stored in a storage device. Such a library having programs registered therein is referred to as a function component library M4.

Subsequently, specifications for specifying operations for each fabrication facility are created by customizing the fabrication facility operation library M1, the individual equipment operation specifications M2 and the function component library M4. More specifically, fabrication facility operation specifications M5 are created by selecting necessary information from the fabrication facility operation library M1. The fabrication facility operation specifications M5 specify information related to operations of the equipment and are described from control and work points of view.

Then, a fabrication facility system plan M6 is created by selecting necessary function components (programs) from the function component library M4 conforming to the fabrication facility operation specifications M5. Thus, components or programs for realizing necessary functions at the fabrication facility are specified. Also, work instructions M7 indicating a procedure for actual work are created by using the fabrication facility operation specifications M5 and the individual equipment operation specifications M2. Further, the programs (function components) are actually downloaded according to the fabrication facility system plan M6 so as to create system operation test specifications M8 for carrying out a test for checking expected operations.

Then, the customized equipment is tested by operating it according to the work instructions M7. Finally, the customized equipment is brought into actual operation.

Thus, different operations may be standardized by registering operations common to each fabrication facility in libraries (at least the fabrication facility operation library M1 and the function component library M4) which may be stored as a database. For example, when newly building a fabrication facility information related to operations required at that fabrication facility is selected from information related to operations (operation units described below) in the libraries. The selected information is then customized for each fabrication facility. Thus, a system for the new fabrication facility may be easily and efficiently constructed and started up.

Also, the above-described libraries and specifications M5–M8 to be customized may be fully or partly included in a database or may be in the form of documents.

In the following, FIG. 1 will be described in detail.

First, the fabrication facility operation library M1 will be described. As described above, in the fabrication facility operation library M1, operations of the fabrication facilities are described in a predetermined format in terms of control and work. The operations of the fabrication facilities are not described by each process step in terms of equipment used or conditions but are described in terms of control and work so as to concern work to be carried out at each process step and associated items to be controlled. Therefore, it is easy to register common operations into libraries and to customize the system based on the libraries.

Figure 2:
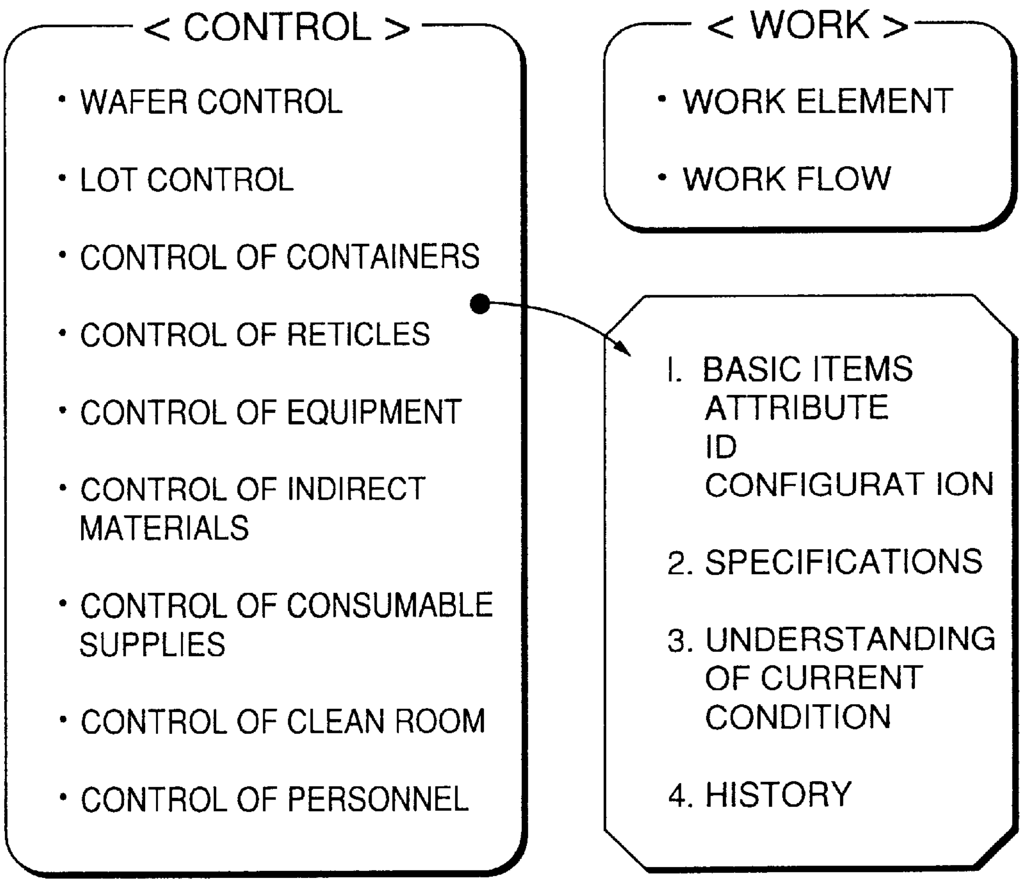
FIG. 2 is a diagram showing a configuration of a fabrication facility operation library used in the present invention.

FIG. 2 is a diagram showing a configuration of the fabrication facility operation library M1. FIG. 2 shows an example of items related to the control in a wafer process of a semiconductor device fabrication facility and also shows an example of items related to the work at the fabrication facility. Also, each one of the control items is described by four sub-items shown in FIG. 2. The four items are basic items, which further include an attribute, an ID and a configuration, specifications, understanding of current condition and history. The work items include at least information related to a work element and a work flow.

The above-described control and work are organized conforming to the predetermined format shown in FIG. 3 and are registered into a library (database). As shown in FIG. 3, control and work are defined as items of the library and control items and work items are defined as sub-items 1. Each of the control items is described by the basic items, the specifications, the understanding of the current state and the history, all of which are defined as sub-items 2. Also, each of the work items is described by the sub-items 2 shown in the figure.

In order to describe the fabrication facility operation library M1 in detail, a library for control of reticles will be described with reference to FIGS. 4 to 10.

Sub-item 2 is described using a unit referred to as an operation unit. The operation unit is a basic unit for items constructing control and work, and each operation unit is given a respective unit number. For example, the "attributes" of the basic items shown in FIG. 4 indicate basic items related to the reticle and are described by operation units such as a scaling factor and size. "A00001" is given to the scaling factor as a unit number. The ID specifies an individual reticle and includes items related to the handling of the reticle. In the example shown in FIG. 4, the ID includes two operation units. The configuration specifies basic rules for control of reticles. In the example shown in FIG. 4, the configuration includes one operation unit specifying that the reticle case, the reticle body and the pellicle are to be handled as an integrated body.

The "specifications" of sub-item 2 shown in FIG. 4 describe items related to specifications of the reticle including items related to the quality of the reticle.

The "understanding of current condition" of sub-item 2 shown in FIG. 4 is described by items related to a location, a state and a quantity of the reticle. The location of the reticle is controlled by an operation unit as shown in FIG. 5. For describing the state of the reticle, for example, state transition diagram #1 shown in FIG. 5, state transition diagram #2 shown in FIG. 7 and state transition diagram #3 shown in FIG. 8 are prepared. These state transition diagrams are used for describing items related to respective current states, triggers which cause the transitions of the states and states after transition. Respective states of the state transition diagram #1 of FIG. 5 and a state transition table of such states are shown in FIG. 6: respective states of the state transition diagram #2 of FIG. 7 and a state transition table of such states are shown in FIGS. 7 and 8; and respective states of the state transition diagram #3 of FIG. 8 and state transition table of such states are shown in FIGS. 9 and 10. Also, contents of FIGS. 5 to 10 will not be described here since the contents are apparent in themselves.

The "history" of sub-item 2 shown in FIG. 10 describes a progress of process steps for the reticle. In the example shown in FIG. 10, three operation units are specified.

Other control items such as lot control shown in FIG. 3 are also described by a basic item, specifications, understanding of current state and history in a similar manner.

In the example shown in FIG. 3, work element and work flow are specified for the sub-item 1 of work. For example, work element specifies elements such as equipment and materials for work related to a wafer process by describing these elements as sub-items 2. In an example shown in FIG. 3, a wafer, a lot, a container, equipment, a reticle, indirect materials and a system terminal are specified as sub-items 2. Work flow is provided by patterning and giving meanings to a series of work in the fabrication facilities. In the example shown in FIG. 3, a product processing operation, process support activities and abnormality handling work are specified as work flow.

Thus, items related to operations and work are organized so as to form a hierarchy constructed by item, sub-item 1 and sub-item 2, and are described in terms of operation units, so as to specify basic control and work of the fabrication facility and register such basic control and work in a database. Accordingly, it is then possible to specify various operations by a combination of operation units.

In the following, the individual equipment operation specifications M2 will be described. As described above, the individual equipment operation specifications M2 specify items related to operations of individual equipment in the fabrication facility and describe an outline of the equipment, premises for operation, operation specifications and data specifications. As an example of the individual equipment operation specifications M2, operation specifications of thin film deposition equipment is shown in FIGS. 11 to 13.

FIG. 11 shows an example of an outline of an equipment and premises of operation for the thin film deposition equipment. FIG. 12 shows operations for starting lot processing as an example of operation specifications of the thin film deposition equipment. FIG. 13 shows data specifications related to the thin film deposition equipment. Such individual equipment operation specifications M2 are registered in a library (or in a database) for each one of a plurality of thin film deposition equipment or other equipment. Also, the individual equipment operation specifications M2 may have either all items or only items directly related to creating the above-described function specifications M3, for example, the data specifications, registered in a library.

Next, the function specifications M3 will be described. The function specifications M3 describe various control functions necessary for operations of the fabrication facilities. The control functions are functions necessary for realizing exact understanding of the operations of the fabrication facilities and for appropriate controls. The control functions are such as control of progress, control of schedule, control of yield, control of production specifications (spec control), control of reticle production and locations. The function specifications M3 specified for each function include data to be controlled and a message interface for specifying output information in response to requests from the operator. Also, the data to be controlled can be generally divided into the above-described basic items (FIG. 3) and items related to states or history.

FIG. 14 shows an example of function specifications of production specifications (spec) as an example of the function specifications M3. As shown in FIG. 14, items of spec control (SPC) and items of process history control are specified as control data. Also, a message interface specifies items to be output in response to requests from the operator. The message interface shown in FIG. 14 specifies that when lot ID is input as input information, a result of measurement of the input lot ID is searched for and the searched-for control data is output as output information. Also, a corresponding work element, that is to say, a work element related to the result of measurement of the lot ID, is output. FIG. 14 shows an example where a certain etching (AA etching) had a standard value of 0.56 $\mu$m and a control range (acceptable range) of ±0.005 $\mu$m and where a certain lot (FED00005678) had a measured value of 0.561 $\mu$m (process history control). In this case, when the above-described lot ID is selected as input information, data stored in the process history control is output as output information. Also, since the control is closely associated with the specifications of the equipment to be controlled, the control is created with reference to the individual equipment operation specifications M2.

Subsequently, programs for actually realizing control functions specified in the specifications will be created from such function specifications M3. The programs correspond to the above-described function components in the function component library M4. For example, a program conforming to the function specifications M3 of the spec includes a process of measuring and storing an amount of etching for each lot and, when there is an input of ID, outputting corresponding result of measurement.

The registering of the common operations of the fabrication facilities into the libraries has been described in the above description.

In the following, fabrication facility operation specifications M5 will be described. The fabrication facility operation specifications M5 are created for each fabrication facility using the above-described libraries registered in a database. The fabrication facility operation specifications M5 have the same format as that of the fabrication facility operation library M1 shown in FIG. 3. The fabrication facility operation specifications M5 are created by selecting necessary operation units from the above-described fabrication facility operation library M1. The fabrication facility operation specifications M5 include operation units related to control and work.

FIGS. 15 to 18 are an example of the fabrication facility operation specifications M5 related to reticles created from the above-described fabrication facility operation library M1 related to reticles. Operation rules related to reticles, which are the fabrication facility operation specifications M5 shown in FIGS. 15 to 18, are created by selecting operation units describing operations of the fabrication facility from FIGS. 4 to 10. For example, attributes of the basic items of the reticle control of the fabrication facility shown in FIG. 15 are described by eight operation units such as a scale factor or a size. The fabrication facility operation specifications M5 created in this manner are stored in the database of the fabrication facility, as described below.

Now, the fabrication facility system plan M6 is created conforming to the fabrication facility operation specifications M5. The fabrication facility system plan M6 is created by selecting necessary function components (programs) from the function component library M4 conforming to the fabrication facility operation specifications M5. Thereby, components for realizing control functions necessary at the fabrication facility, or the programs, are specified. Also, the work instructions M7 indicating the procedures of actual work are created by using the fabrication facility operation specifications M5 and the individual equipment operation specifications M2. For example, an operation procedure of the individual equipment operation specifications M2 of the thin film deposition equipment shown in FIG. 12 differs for each equipment, and it is necessary to show the procedure to the operator. If the fabrication facility is to use a thin film deposition equipment operated conforming to the individual equipment operation specifications M2 shown in FIG. 12, then the procedure for such thin film deposition equipment will be described in the work instructions M7. Further, conforming to the fabrication facility system plan M6, the system operation test specifications M8 are created for actually downloading programs (function components) and for performing a test for checking the expected operations.

Also, the fabrication facility system plan M6, the work instructions M7 and the system operation test specifications M8 may be registered in a database at the fabrication facility, may be in the form of documents or may be both in a database and in document form.

Finally, by using the work instructions M7 and the system operation test specifications M8, individual equipment of the fabrication facility is started-up, function components (programs) are loaded, an operation test is performed for the whole system and then the system is brought into an actual operation as described below.

Figure 19:
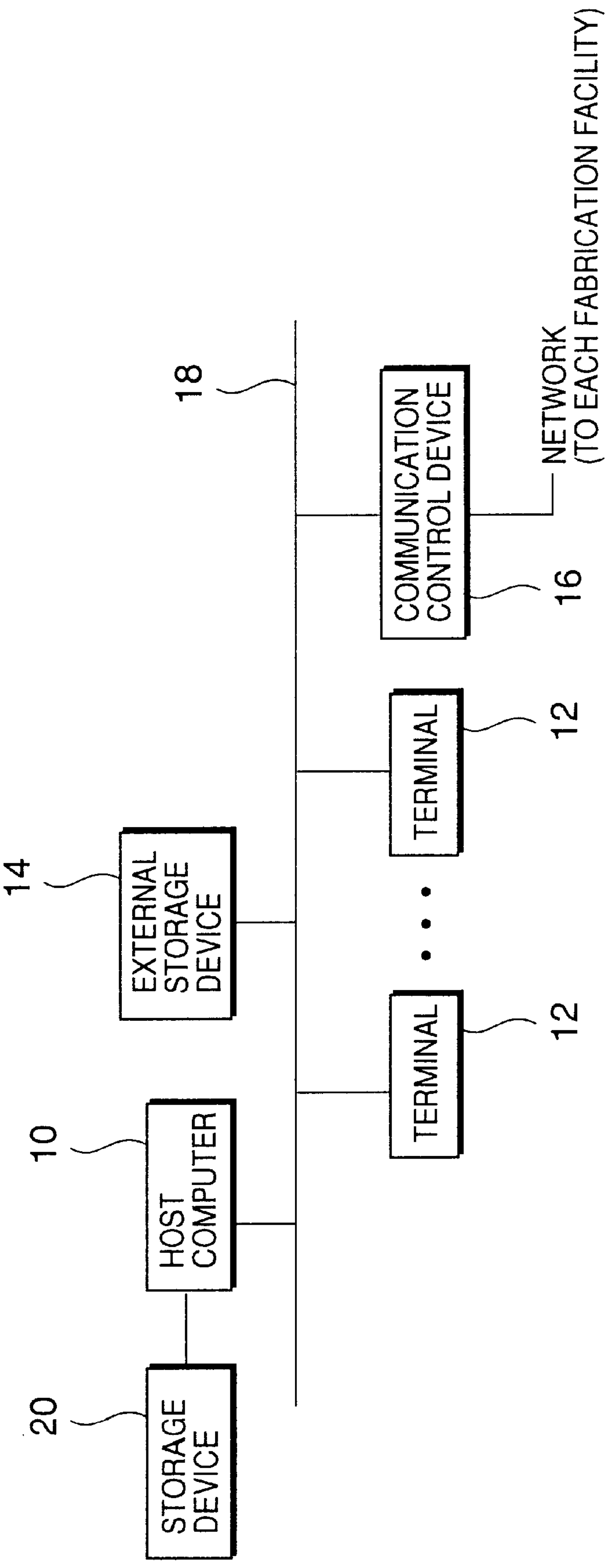
FIG. 19 is a block diagram showing an embodiment of a host computer system used for implementing the present invention.

The above-described fabrication facility operation library M1 to at least the fabrication facility operation specifications M5 are created by using a computer system (in the following, also referred to as a host computer system). FIG. 19 is a block diagram showing an example of such a computer system. The illustrated computer system is provided with a host computer 10 including a CPU, a plurality of terminals 12 (such as work stations and personal computers), a mass storage external storage device 14 such as a hard disk device, a communication control device 16 for communication with the network, and a common bus 18 for connecting the above-described elements of the computer system.

Figure 20:
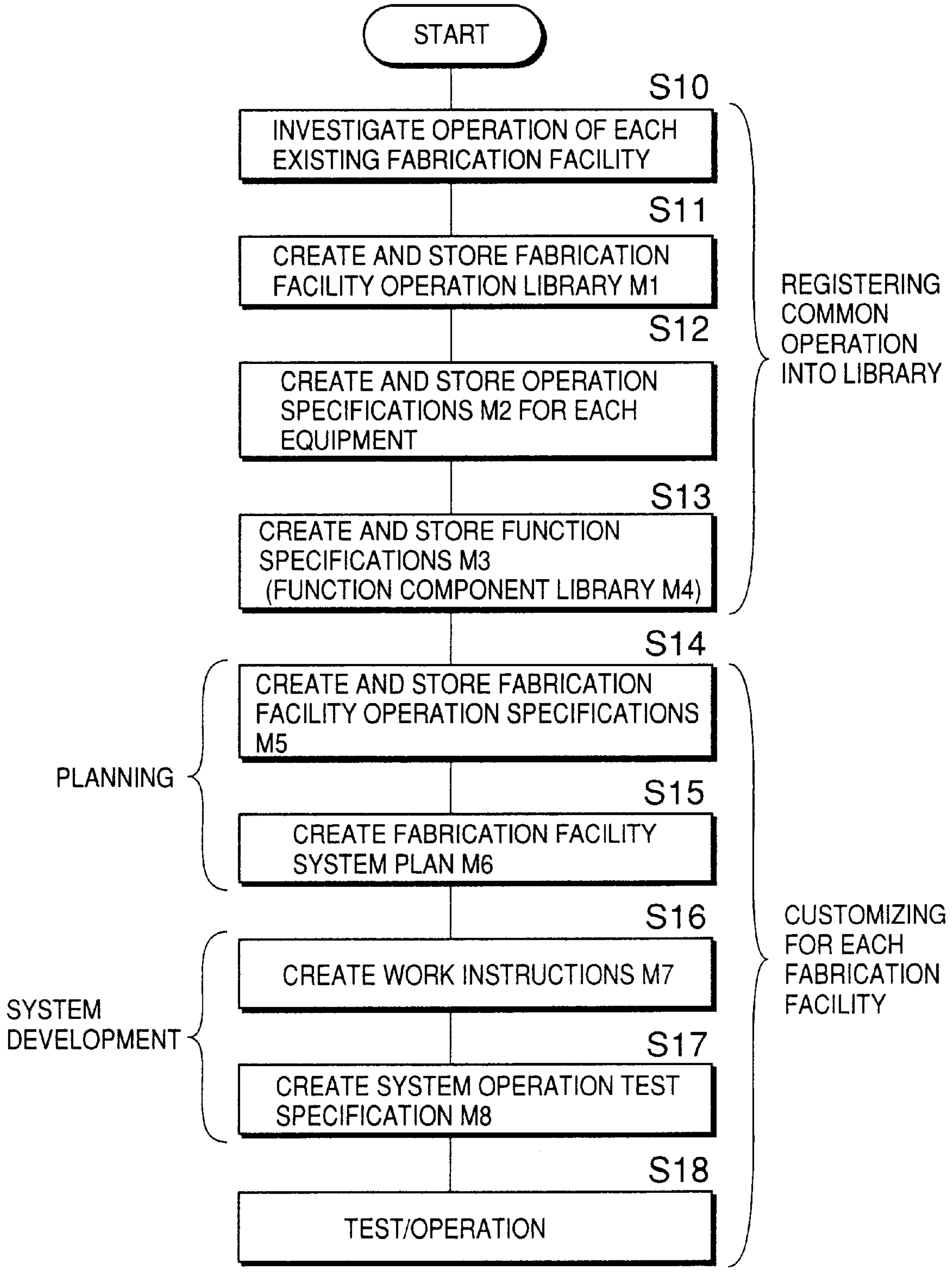
FIG. 20 is a flowchart showing steps of registering common operations into libraries and steps of customizing the libraries which can be executed by the host computer system shown in FIG. 19.

The host computer 10 operates corresponding to an operational flowchart shown in FIG. 20. This flowchart is stored in the storage device 20 which is a storage medium such as a hard disk device shown in FIG. 19. The host computer 10 generally controls the creation of, for example, the fabrication facility operation library M1 corresponding to the operational flowchart shown in FIG. 20. However, individual steps described below are performed at terminals 12.

First, in step S10 of FIG. 20, data is collected by investigating an operation for each of the existing fabrication facilities. The data is collected from both control and work points of view for this operation. Also, data is collected which indicates what type of equipment is used. Next, in step S11, the above-described fabrication facility operation library M1 is created. This creating step is performed conforming to the format shown in FIG. 3, for example, by guiding an operator in an interactive manner and by storing input data into, for example, the external storage device 14 conforming to such a format. Since various methods of registering into a library (or a database) by such a procedure are known, any appropriate one of the known methods may be used. Next, in step S12, the individual equipment operation specifications M2 are created and are stored in the external storage device 14. As described above, the individual equipment operation specifications M2 may fully or partly, such as only the operations related to the data specifications shown in FIG. 13, be registered in a database. Then, the function specifications M3 and the function component library M4 are created and are registered in the database. The function component library M4 includes operations specified in the function specifications among software (programs) realizing the above-described control function used in each existing fabrication facility, that is to say, common operations among control functions of each fabrication facility. Further, various modifications and additions may be made to the function component library M4. Also, any other control functions used at each fabrication facility may be further registered in a library.

The above-described steps S10 to S13 are steps for registering common operations for each fabrication facility.

The following steps S14 to S18 are steps of customization for each fabrication facility. Steps S14 and S15 are planning steps and steps S16 and S17 are system development steps.

First, in step S14, the fabrication facility operation specifications M5 are created and are stored in the external storage device 14. As described-above, the fabrication facility operation specifications M5 having the same format as that of the fabrication facility operation library M1 are configured by selecting operation units in the fabrication facility operation library M1 according to the operation of the fabrication facility, or, in other words, by customizing the fabrication facility operation library M1. This is performed at one of the terminals 12 by, for example, displaying the fabrication facility operation library M1 on the display of the terminal 12 and subsequently clicking necessary operation units using a mouse. Then, in step S15, the fabrication facility system plan M6 is created. The fabrication facility operation specifications M5 and the function specifications M3 are both displayed on the display of the terminal 12 and necessary items are input so as to create the fabrication facility system plan M6. Also, the operator may create a system plan on a piece of paper by referring to the specifications displayed on the display.

In step S16, the work instructions M7 are created in the same manner as has been described above. The individual equipment operation specifications M2 and the fabrication facility operation specifications M5 are displayed on the display of one of the terminals 12. Further, in step S17, the system operation test specifications M8 are created. If the fabrication facility system plan M6 has been registered in the database, the work instructions M7 are created by having the information in the database displayed on the display of the terminal 12.

Also, processes corresponding to steps S14 to S18 may be performed at each fabrication facility in this case, a program for controlling the processes corresponding to steps S10 to S14 is stored in the storage device 20 of FIG. 19 and a program for controlling the processes corresponding to steps S15 to S18 is stored in the storage device of the computer in each fabrication facility. Then, the processes corresponding to steps S14 to S18 may be performed for each fabrication facility by connecting the host computer system shown in FIG. 19 to computer systems of each fabrication facility via a network.

Now, referring to FIG. 21, a computer system in the fabrication facility will be described which is operated by using, for example, the fabrication facility operation specifications M5 customized as has been described above. The computer system provided at each fabrication facility includes a computer 30 including a CPU, a storage device 40 connected to the computer 30, a plurality of terminals 32, a mass storage external storage device 34, two communication control devices 36, 42 and a bus 38. The communication control device 36 controls communication with the oxidization equipment, etching equipment and thin film deposition equipment provided at the fabrication facility. The communication control device 42 controls communication with the host computer system shown in FIG. 19. The storage device 40 stores programs or data necessary for the computer 30 to operate. For example, the storage device 40 stores a program including steps S14 to S18 of FIG. 20. The computer 30 generally controls this computer system. The external storage device 34 stores a database of the control items or function components.

Figure 21:
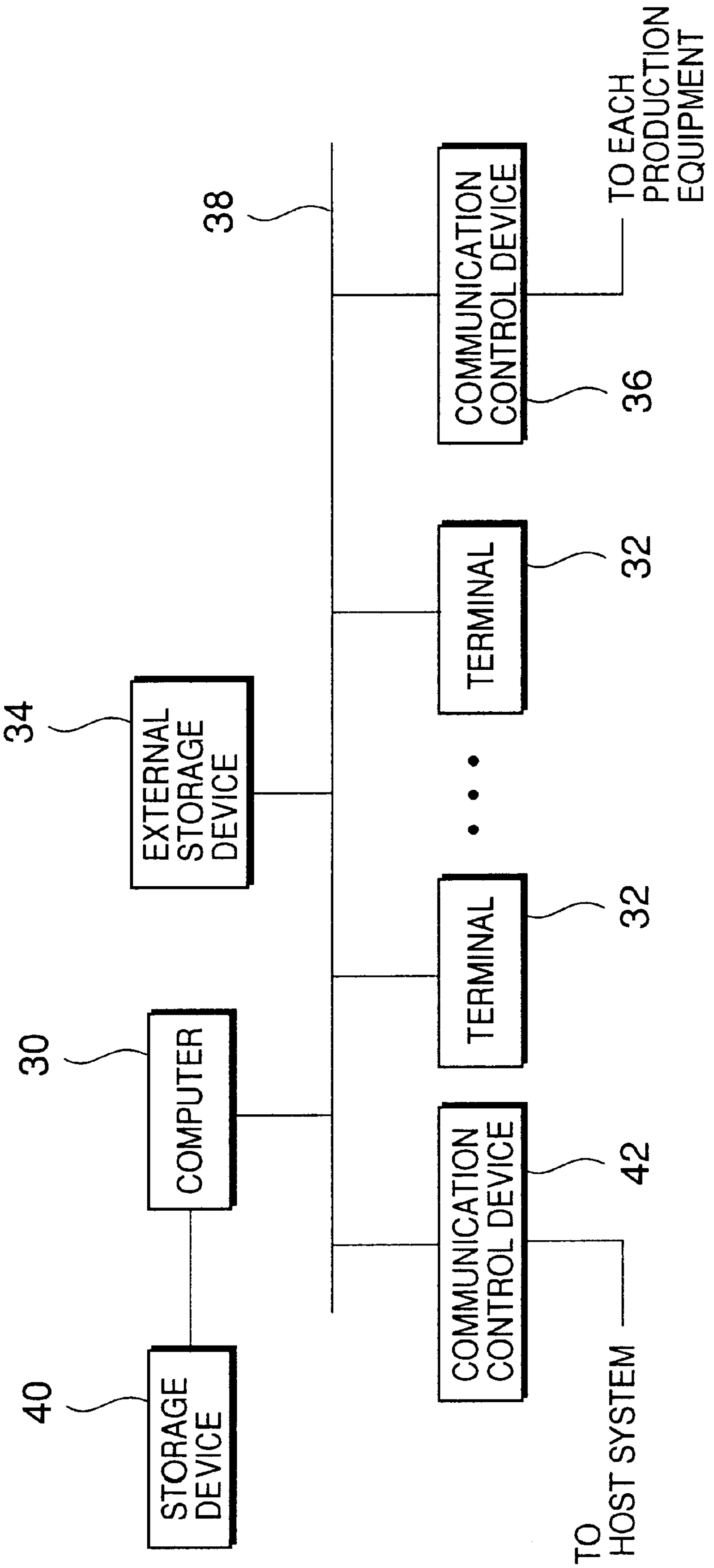
FIG. 21 is a block diagram showing an embodiment of a computer system provided at each fabrication facility.
Figure 22:
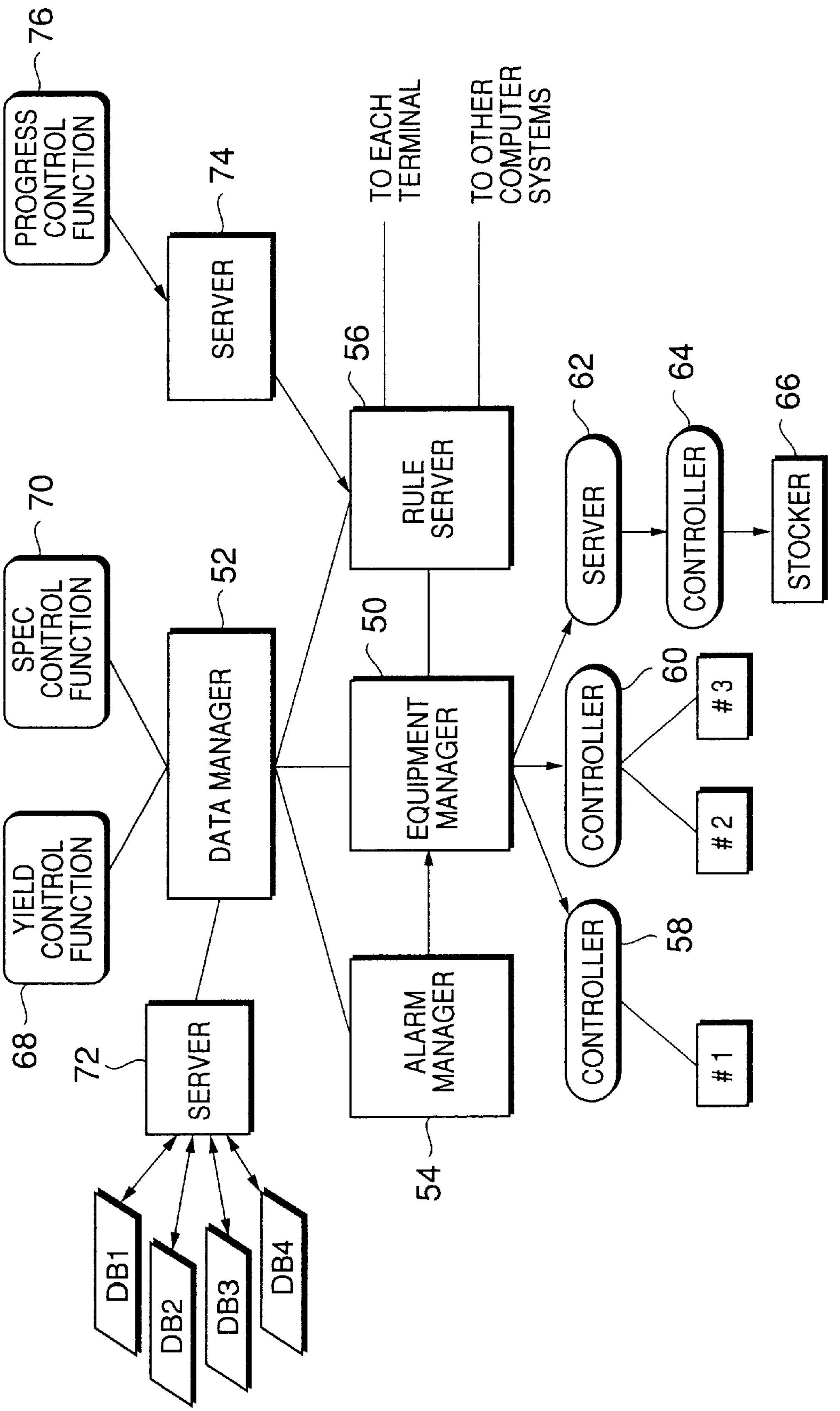
FIG. 22 is a block diagram showing the configuration of the computer system shown in FIG. 21 mainly with functions of the system.

FIG. 22 is a block diagram showing a configuration of the computer system of FIG. 21 with regard to the function of the computer system of FIG. 21. Each part shown in FIG. 22 is mainly a function which can be realized by the computer 30 shown in FIG. 21. FIG. 22 illustrates three managers: an equipment manager 50, a data manager 52 and an alarm manager 54, all of which may be realized by the computer 30. These managers may establish communication (or exchange data) between each other. The equipment manager 50 controls the whole equipment and production equipment such as the thin film deposition equipment. The data manager 52 organizes information transmitted by a software (programs) such as the function components, and then distributes the information to other software (programs) requiring such information.

The equipment manager 50 controls production equipment #1, #2 and #3 such as oxidization equipment, etching equipment and thin film deposition equipment via controllers 58, 60 other than the computer 30 and also controls the stocker 66 of the wafer via the server 62 and the controller 64. The data manager 52 controls and executes the function components. In the example shown in FIG. 22, a yield control function 68 and a spec control function 70 are used as the function components. Also, a plurality of (four in FIG. 22) databases DB1 to DB4 are provided via the server 72 under control of the data manager 52. These databases are provided for each control item such as reticle, lot, or wafer. Data is written to and read from these databases in response to instructions from the function components such as the yield control function 68 and the spec control function 70 under control of the data manager 52. Further, a progress control function 76 is provided as a function component. The progress control function 76 is connected to each manager 50, 52, 54 via the server 74. A rule server 56 includes a function of the communication control device 42 of FIG. 21. The rule server 56 controls connections of the host computer system and/or terminals shown in FIG. 21 to each manager 50, 52, 54 so as to organize a procedure for exchanging information. Also, the alarm manager 54 performs a detection of various alarms and an announcement to the operator.

Figure 23:
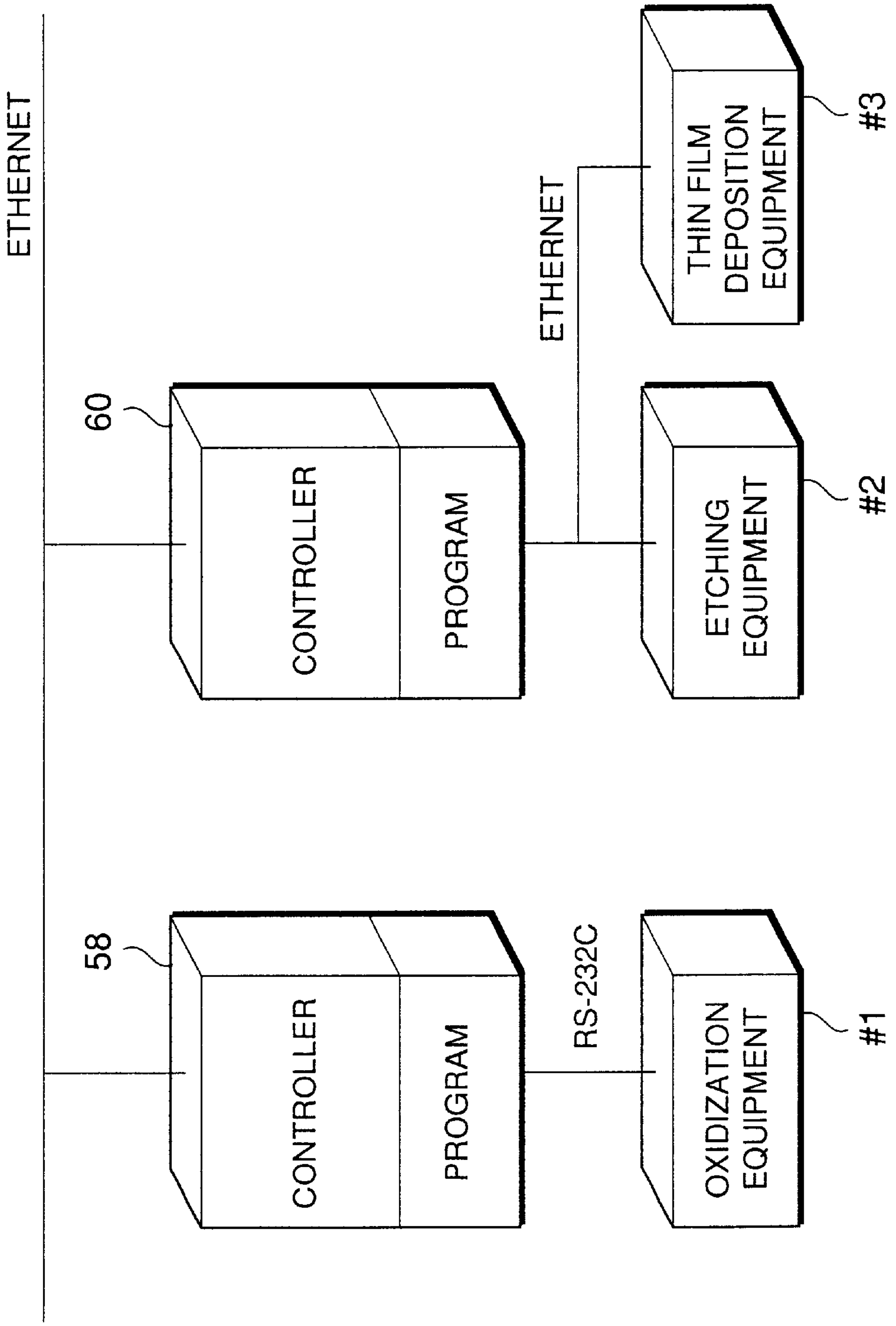
FIG. 23 is a detailed block diagram showing a part of the computer system shown in FIG. 21.

FIG. 23 is a diagram showing controllers 58 and 60 shown in FIG. 22 and the equipment #1 to #3 controlled by the controllers 58 and 60. The controller 58 controls the oxidization equipment #1 via an interface (RS-232C, in the example shown in FIG. 23). The controller 58 is provided with a CPU and a software (programs) for operating the CPU. Also, the controller 60 controls the etching equipment #2 and the thin film deposition equipment #3 via an interface (an Ethernet, in the example shown in FIG. 23). The controllers 58 and 60 are connected to the equipment manager 50 shown in FIG. 22 via the Ethernet.

In the following, it will be described how the system in the fabrication facility shown in FIGS. 21 to 23 are customized using the above-described libraries and finally brought into operation. In an example described below, it is assumed that the steps S14 to S18 shown in FIG. 20 are performed at each fabrication facility.

First, by using one of a plurality of terminals 32 shown in FIG. 21, the fabrication facility operation library M1 stored in the external storage device 14 (FIG. 19) of the host computer system is read out and then stored in the external storage device 34 shown in FIG. 21. This process is performed via the communication control device 16 shown in FIG. 19 and the communication control device 42 shown in FIG. 21. The terminal 32 reads out necessary operations from the fabrication facility operation library M1 and customizes such operations under control of the computer 30. During this process, the storage device 40 is used as a work area and the contents of the storage device are transferred to the external storage device 34 upon completion of the customization processes. The information thus transferred is registered into the above-described fabrication facility operation specification M5.

Also, the external storage device 34 of the host computer system as shown in FIG. 21 is accessed from the terminal 32 and the function component library M4 is referred to therefrom so as to create the fabrication facility system plan M6 and store it into the external storage device 34 as described above. Further, the individual equipment operation specifications M2 stored in the external storage device 14 of the host computer system and the fabrication facility operation specifications M5 stored in the external storage device 34 are read out by the terminal 32. The work instructions M7 are created by referring to the individual equipment operation specifications M2 and the fabrication facility operation specifications M5 and are stored in the external storage device 34. Also, by referring to the fabrication facility system plan M6, the system operation test specifications M8 are created and are stored in the external storage device 34.

Now, when there is no modification to the individual equipment operation specifications M2 for the oxidization equipment #1, the etching equipment #2 and the thin film deposition equipment #3, the software of the controllers shown in FIG. 23 is started-up with the original individual equipment operation specifications M2. Also, when customization is necessary, programs are customized (for example, parameters specific to the equipment are set) by the terminal 32 via the controllers 58, 60. During customization, for example, the work instructions M7 are referred to. Also, processes for a case where certain equipment is newly built and there is no corresponding individual equipment operation specifications M2 will be described later.

Further, by referring to the fabrication facility system plan M6 and the system operation test specifications M8, the function components (programs) necessary for the fabrication facility are read out from the function component library M4 stored in the external storage device 14 of the host computer system by the terminal 32. Then the function components (programs) necessary for the fabrication facility are stored in the external storage device 34 shown in FIG. 21. These function components are executed by the computer 30 shown in FIG. 21 so as to realize the yield control function 68, the spec control function 70 and the progress control function 76 shown in FIG. 22. Subsequently, predetermined tests are carried out and the system is brought into operation. Also, as has been described above, these control functions have a message interface described with reference to FIG. 14. Therefore, when the lot ID is input as input information shown in FIG. 14 from the terminal 32, this lot ID is transferred to the spec control function 70 via the rule server 56 and the data manager 52. The spec control function 70 then obtains necessary data via the data manager 52 and the server 72 and outputs the output information to this terminal 32 via the rule server 56.

Thus, by grouping the common operations related to the operation of the fabrication facility and by customizing such common operations for each fabrication facility, it is possible to newly build a fabrication facility easily and efficiently. For example, by such customization, not only can the newly built fabrication facility be started up, but also new operations can be easily defined for systems of the existing fabrication facilities.

The description above relates to customization of the fabrication facility operation library M1, the individual equipment operation specifications M2, the function specifications M3 and the function component library M4, all of which have already been stored in the database. However, the following description relates to introducing new equipment to a certain fabrication facility, in which case the fabrication facility operation library M1 or the individual equipment operation specifications M2 corresponding to the new equipment are not yet registered in a library.

Figure 24:
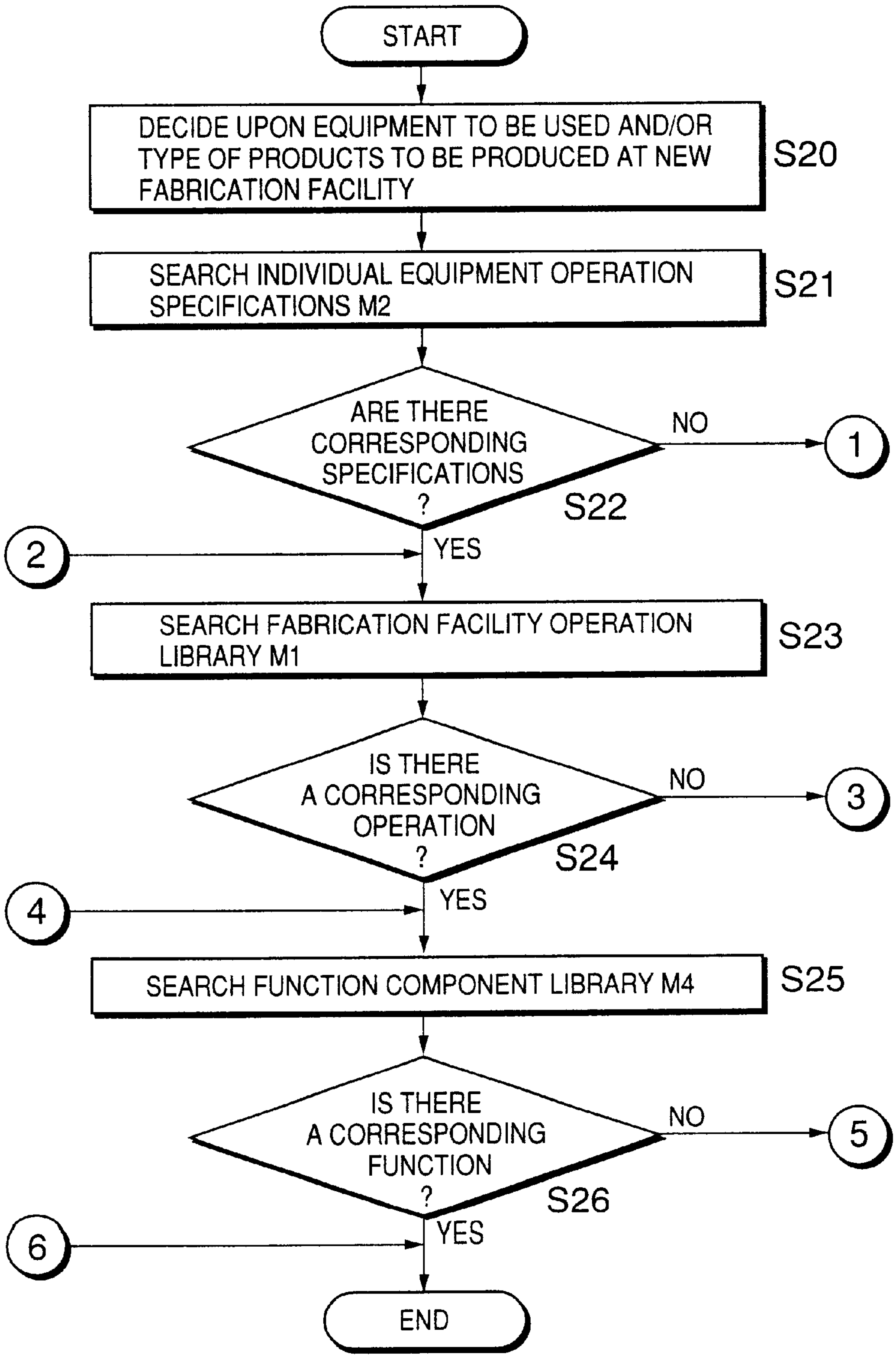
Fig. 24 is a flowchart showing a procedure for registering information, which is not yet registered in libraries, into libraries.

FIG. 24 is a flowchart showing a procedure executed by the host computer system described above case. This flowchart is stored in the storage device 20 shown in FIG. 19 and is executed by the host computer 10 in response to the request from the terminal 12.

Figure 25:
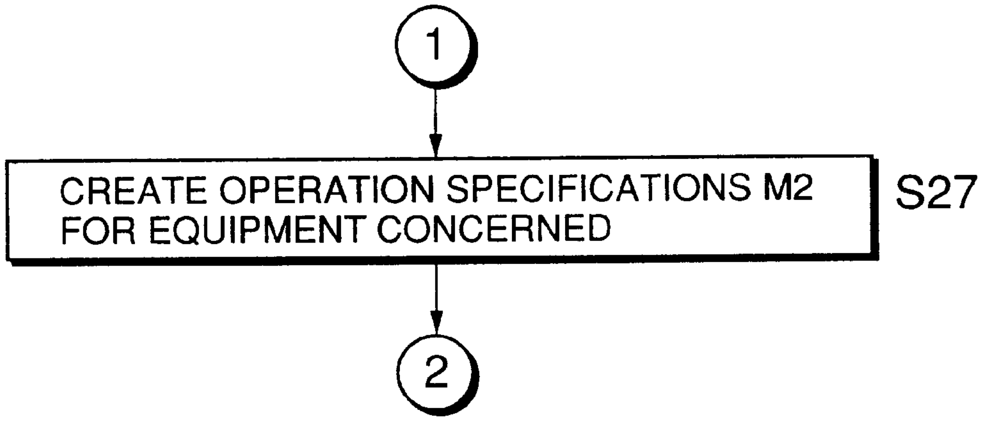
FIGS. 25 to 27 are diagrams showing process steps to be called from the flowchart shown in FIG. 24.
Figure 26:
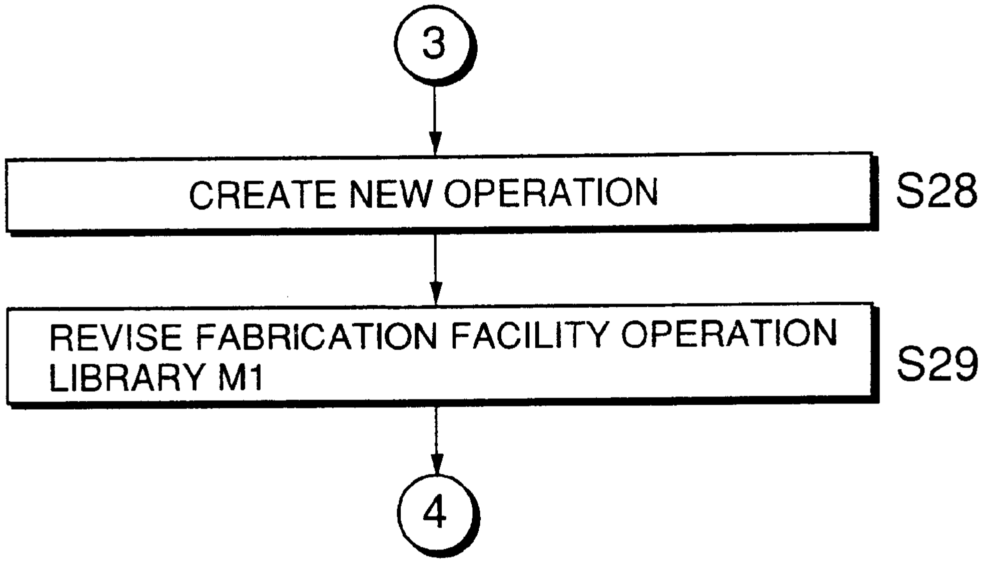
Figure 27:
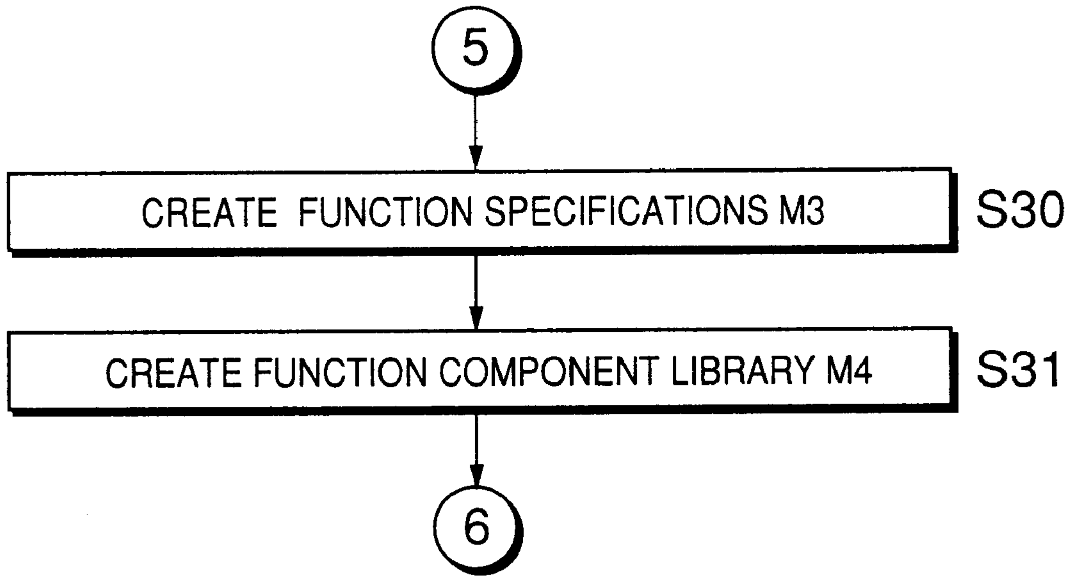

First, equipment used or types of products to be produced at the new fabrication facility are decided upon in step S20 and the external storage device 14 is accessed so as to search the individual equipment operation specifications M2 in step S21. In step S22, it is determined whether the individual equipment operation specifications M2 corresponding to the equipment decided upon in step S20 exist or not. If the individual equipment operation specifications M2 exist (YES), the procedure proceeds to step S23. If the individual equipment operation specifications M2 do not exist (NO), the procedure proceeds to step S27 shown in FIG. 25. In step S27, the individual equipment operation specifications M2 are created as described above and stored in the external storage device 14. Then, the procedure proceeds to step S23. In step S23, the external storage device 14 is accessed so as to search the fabrication facility operation library M1. Then, in step S24, it is determined whether there is an operation corresponding to the equipment decided upon in step S20. If there is such an operation (YES), the procedure proceeds to step S25. If there is no such operation (NO), the procedure proceeds to step S28 shown in FIG. 26. In step S28, a new operation is created. In step S29 also shown in FIG. 26, the fabrication facility operation library M1 is revised and is stored in the external storage device 14. Then, the procedure proceeds to step S25. In step S25, the function component library M4 stored in the external storage device 14 is searched. In step S26, it is determined whether the function component of the equipment decided upon in step S20 exists or not. If the function component exists (YES), the procedure is terminated and if the function component does not exist (NO), the procedure proceeds to step S30 shown in FIG. 27. In step S30, the function specifications M3 of the requested new function are created. In step S31 shown in FIG. 27, the function component library M4 is created according to the function specifications M3 and is stored in the external storage device 14.

Since information necessary for a new fabrication facility is thus registered in a library in the above-described steps, customization for the new fabrication facility may be carried out as described above with reference to FIG. 20. The order of search is not limited to the order shown in FIG. 24 and can be of any order. Also, steps S21, S23 and S25 are shown in a continuous procedure, but these steps may be provided as independent steps.

Thus, by efficiently processing the requests for the operations, by registering common operations into libraries and by customizing the registered common operations, it is possible to easily and efficiently plan and start up the system not only when building a new fabrication facility but also when renewing the existing fabrication facility.

Further, the present invention is not limited to these embodiments, but variations and modifications may be made without departing from the scope of the present invention.

What is claimed is:

1. A device for supporting development of a system for a fabrication facility, said device comprising:

first means for registering information related to standard operations common to a plurality of fabrication facilities into a first library, said standard operations being classified from control and work points of view;

second means for registering programs corresponding to a plurality of predetermined system executable functions into a second library by referring to said information to the standard operations registered in the first library; and third means for creating fabrication facility operation specifications specifying operations of the system by selecting information related to operations of the system from the first library and by customizing the selected information.

2. The system development supporting device as claimed in claim 1, wherein said first means registers the information related to the standard operations of the system using operation units which are basic units of control and work.

3. The system development supporting device as claimed in claim 1, further comprising:

fourth means for obtaining functions necessary for the system by selecting functions required for the system from said plurality of functions corresponding to said programs registered in the second library and by customizing the selected functions.

4. The system development supporting device as claimed in claim 3, further comprising:

fifth means for determining whether information related to the operations of the system exists in the first library; and sixth means for storing information related to operations of the system into the first library if the fifth means determines that said information related to the operations of the system does not exist in the first library.

5. The system development supporting device as claimed in claim 1, wherein the first library and the fabrication facility operation specifications have a common format.

6. A method for supporting development of a system for a fabrication facility, said method comprising the steps of:

a) registering information related to standard operations common to a plurality of fabrication facilities into a first library, said standard operations being classified from control and work points of view;

b) registering programs corresponding to a plurality of predetermined system executable functions into a second library by referring to said information related to the standard operations registered in the first library; and c) creating fabrication facility operation specifications specifying operations of the system by selecting information related to operations of the system from the first library in said step a) and by customizing the selected information.

7. The system development supporting method as claimed in claim 6, wherein, in said step a), said standard operations of the system are registered into the first library using operation units which are basic units of control and work.

8. The system development supporting method as claimed in claim 6, further comprising the step of:

d) obtaining functions necessary for the system by selecting functions required for the system from said plurality of functions corresponding to said programs registered in the second library in said step b) and by customizing the selected functions.

9. The system development supporting method as claimed in claim 8, further comprising the steps of:

e) determining whether information related to the operations of the system exists in the first library in said step a); and f) storing information related to operations of the system into the first library if, in said step e), it is determined that said information related to the operations of the system does not exist in said information registered in the first library is said step a).

10. The system development supporting method as claimed in claim 6, wherein the first library and the fabrication facility operation specifications have a common format.

11. A computer readable medium storing program code for supporting development of a system for a fabrication facility comprising:

first program code means for registering information related to standard operations common to a plurality of fabrication facilities into a first library, said standard operations being classified from control and work points of view;

second program code means for registering programs corresponding to a plurality of predetermined system executable functions into a second library by referring to said information related to the standard operations registered in the first library; and third program code means for creating fabrication facility operation specifications specifying operations of the system by selecting information related to operations of the system from the first library and by customizing the selected information.

12. An article of manufacture comprising a computer useable medium having computer-readable code means embodied therein for causing a computer to support development of a system for a fabrication facility, the computer-readable code means comprising:

computer-readable program code means for registering information related to standard operations common to a plurality of fabrication facilities into a first library, said standard operations being classified from control and work points of view;

computer-readable program code means for registering programs corresponding to a plurality of predetermined system executable functions into a second library by referring to said information related to the standard operations registered in the first library; and computer-readable program code means for creating fabrication facility operation specifications specifying operations of the system by selecting information related to operations of the system from the first library and by customizing the selected information.

* * * * *